United States Patent
Rej

(10) Patent No.: US 7,243,302 B1
(45) Date of Patent: Jul. 10, 2007

(54) SPLIT TREE DATA STRUCTURE

(75) Inventor: Pawel Rej, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 613 days.

(21) Appl. No.: 09/599,950

(22) Filed: Jun. 23, 2000

(30) Foreign Application Priority Data

Jun. 24, 1999 (AU) .................... PQ1175

(51) Int. Cl.
*G06F 15/00* (2006.01)

(52) U.S. Cl. ..................... 715/515; 715/513

(58) Field of Classification Search ........... 715/513, 715/515

See application file for complete search history.

(56) References Cited

U.S. PATENT DOCUMENTS

| | | | | |
|---|---|---|---|---|
| 5,173,125 A | * | 12/1992 | Felding | .................. 134/22.11 |
| 5,173,853 A | * | 12/1992 | Kelly et al. | .................. 715/530 |
| 5,633,996 A | * | 5/1997 | Hayashi et al. | ............. 715/513 |
| 6,334,125 B1 | * | 12/2001 | Johnson et al. | ................. 707/3 |
| 6,505,205 B1 | * | 1/2003 | Kothuri et al. | ............. 707/100 |

FOREIGN PATENT DOCUMENTS

WO    WO 98/10356    * 3/1998

* cited by examiner

*Primary Examiner*—Heather R. Herndon
*Assistant Examiner*—R. Singh
(74) *Attorney, Agent, or Firm*—Fitzpatrick, Cella, Harper & Scinto

(57) ABSTRACT

The present invention relates to document formatting using input trees. A method (30) and apparatus (200) for creating a split tree is provided. Marks are assigned to an input tree, removing the need to split the input tree and allowing the input tree structure to remain intact. The advantage of preserving the original structure of the input tree is that it allows interactive formatting. A method (40) of creating tree fragments from the split tree is also provided.

22 Claims, 9 Drawing Sheets

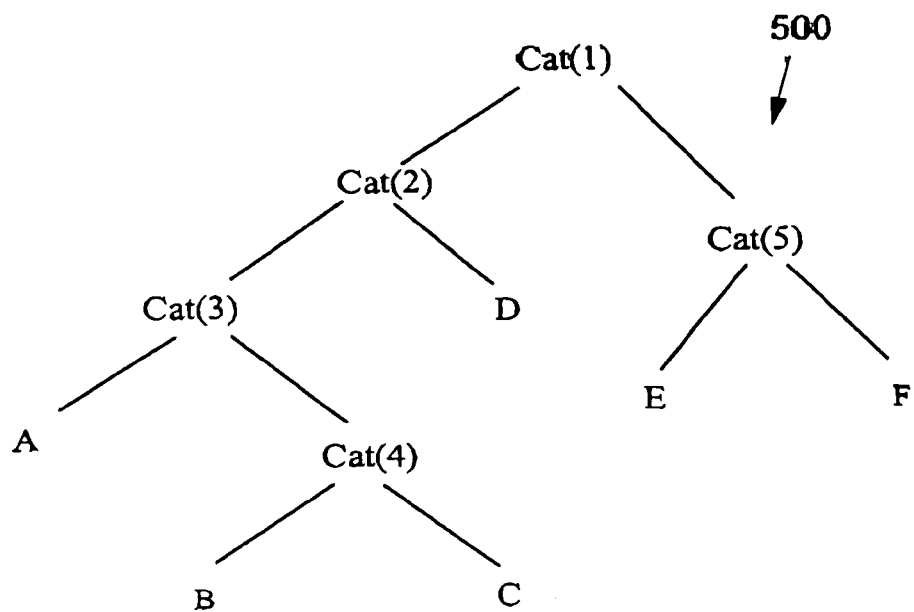
Fig. 5
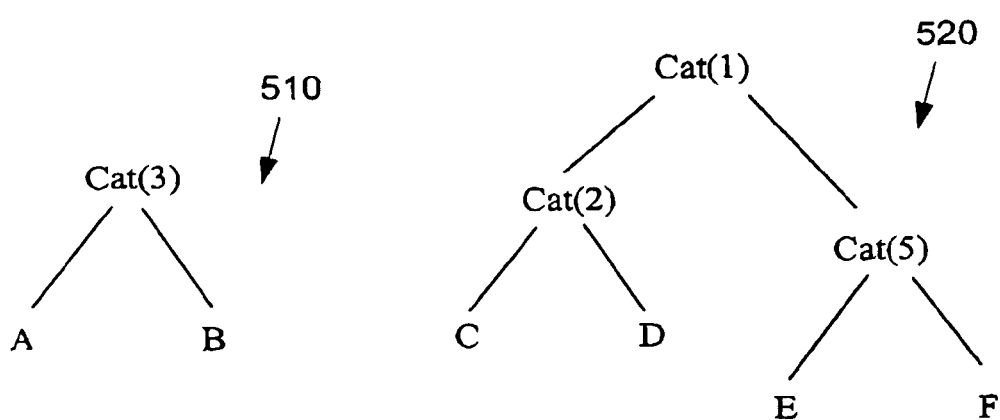
Fig. 6A          Fig. 6B

SPLIT TREE DATA STRUCTURE

TECHNICAL FIELD OF THE INVENTION

The present invention relates generally to document formatting and, in particular, to document formatting using input trees. More specifically, the present invention relates to a method and apparatus for creating a split tree by assigning marks to an input tree and for generating tree fragments from the split tree. The invention also relates to a computer program product including a computer readable medium having recorded thereon a computer program for creating the split tree by assigning marks to the input tree and for generating tree fragments from the split tree.

BACKGROUND ART

High-level languages for document formatting exist in many forms, some of which accept as input a description of a document in the form of an input tree. An example of such an input tree is presented in FIG. 1. The input tree comprises two main types of elements, namely data elements and instruction elements, those elements in FIG. 1 being indicated in FIG. 2. The data elements contain data to be formatted. Each data element can include text or images. Instruction elements contain information used by a document formatter to arrange the data elements on pages when producing an output. As seen in FIG. 3, the data elements form leaf nodes in the tree whereas the instruction elements form nodes. Further, nodes A and B are child nodes of node Cat(2). The left node, Node A in the example, is defined as the first child of node Cat(2), whereas the right node, Node B, is defined as the second child node Cat(2).

Instruction elements can be thought of as operators that define the output positions of data elements. There are a number of instruction elements or operators available. Certain of the instruction elements, for example those defining text size, text spacing and the like, typically only have one child.

The other relevant instruction in FIGS. 1 to 3 is "Cat( )", which performs vertical concatenation. Each concatenation instruction places its left parameter (the first child) above its right parameter (second child). For example, Cat(2) would place the content of data element B below the content of data element A.

As an input, data elements do not have an actual position. The actual position of the data elements is determined by the document formatter by evaluating the input tree. In the example of FIG. 1, the formatter, following the directions given by the instruction elements, determines that the result of the Cat(2) operator is placed above the result of the Cat(3) operator. The Cat(2) operator in turn places the content of data element A above data element 13, and the Cat(3) operator places the content of data element C above data element D. The result is that data element A, B, C and D are stacked in that order.

However, when the content of data elements are placed on a page in order to produce an output, it is sometimes found that the result is too big to fit onto one page. Therefore, placing the content data elements onto the page following the order specified, should the content of a next data element not fit into the space left on the present page, the remainder of the data elements are promoted to a next page. In the example presented in FIG. 1, if only the content of data elements A, B and C can fit onto page 1, then the content of data element D is promoted to page 2. The formatter also positions the data elements on the pages. The result of the evaluation of the input tree is shown in FIG. 4.

To better explain the above, a galley and a galley target need to be defined. A galley is a part of the input tree, whereas a galley target is a placeholder for a galley. The galley is therefore not evaluated at a position in the input tree but rather at the point where it is placed into the galley target. The galley target is a stretchable area on the output area with size 0 when no galley is targeted into it. When a galley is targeted into a galley target, the galley target stretches to accommodate for the incoming galley. The galley is unable to stretch infinitely though. There are restrictions on the maximum size of each galley target. Should it happen that the galley target reaches its maximum size before the galley is exhausted, a new galley target is found for the remainder of the content of the galley and the process of accommodating the remainder of the galley into the new target is continued.

Placing a galley into a series of galley targets involves splitting the input tree into fragments, each fragment filling its target. FIG. 5 shows another example of a galley in the form of an input tree 500. It is assumed that the galley in the example of FIG. 5 is targeted into a sequence of targets, with only data elements A and B fitting into the first galley target in the sequence by taking all the available space defined by the restrictions on the first galley target. The rest of the galley is promoted to the following galley target in the sequence.

FIGS. 6A and 6B show the result after a portion of the galley of FIG. 5 is placed into the sequence of galley targets. The original input tree 500 shown in FIG. 5 is split into the two tree fragments 510 and 520 respectively. The first fragment 510, shown in FIG. 6A, is placed into the first galley target. The remainder of the galley which now resides in the second tree fragment 520, shown in FIG. 6B, is waiting to be placed into the following galley targets. Thus, the original galley was split into two separate smaller trees.

The arrangement described above is used in batch text formatters which produce an output from an input tree. However, this arrangement suffers from the disadvantage that once the galley is split into smaller trees, it is hard to relate the fragmented trees back to their original galley tree. This is for example necessary whenever the order or contents of the data elements are changed, thus preventing interactive formatting.

DISCLOSURE OF THE INVENTION

It is an object of the present invention to substantially overcome, or at least ameliorate, one or more disadvantages of existing arrangements.

According to a first aspect of the invention, there is provided a method of creating a split tree for representing an input tree and at least one tree fragment obtained by splitting the input tree, wherein the input tree comprises a plurality of nodes, said method comprising the steps of:

determining which of the plurality of nodes fit into each galley target; and marking the nodes that fit into each galley target with a mark specific to the galley target so as to create the split tree in which each tree fragment is identified by respective mark.

According to a second aspect of the invention, there is provided a method of splitting a split tree into at least one tree fragment, wherein each of the tree fragment is associated with a mark specific to the tree fragment and the split tree comprises at least one node marked with the mark, said method comprising the steps of:

identifying the at least one node marked with the mark; and creating each tree fragment from the nodes marked with the mark specific to the tree fragment.

According to a third aspect of the invention, there is provided an apparatus for creating a split tree for representing an input tree and at least one tree fragment obtained by splitting the input tree, wherein the input tree comprises a plurality of nodes, said apparatus comprising:

determining means for determining which of the plurality of nodes fit into each galley target; and marking means for marking the nodes that fit into each galley target with a mark specific to the galley target so as to create the split tree in rich each tree fragment is identified by respective mark.

According to a fourth aspect of the invention there is provided an apparatus for splitting a split tree into at least one tree fragment, wherein each of the tree fragment is associated with a mark specific to the tree fragment and the split tree comprises at least one node marked with the mark, said apparatus comprising:

identification means for identifying the at least one node marked with the mark; and creating means for creating each tree fragment from the nodes marked with the mark specific to the tree fragment.

According to a fifth aspect of the invention, there is provided a computer program product including a computer readable medium incorporating a computer program for creating a split tree for representing an input tree and at least one tree fragment obtained by splitting the input tree, wherein the input tree comprises a plurality of nodes, said computer program product comprising:

means for determining which of the plurality of nodes fit into each galley target; and means for marking the nodes that fit into each galley target with a mark specific to the galley target so as to create the split tree in which each tree fragment is identified by respective mark.

According to a sixth aspect of the invention, there is provided a computer program product including a computer readable medium incorporating a computer program for splitting a split tree into at least one tree fragment, wherein each of the tree fragment is associated with a mark specific to the tree fragment and the split tree comprises at least one node marked with the mark, said computer program product comprising:

means for identifying the at least one node marked with the mark; and means for creating each tree fragment from the nodes marked with the mark specific to the tree fragment.

BRIEF DESCRIPTION OF THE DRAWINGS

A preferred embodiment of the present invention will now be described with reference to the drawings, in which:

FIG. 5 shows an original galley before splitting;

FIGS. 6A and 6B show the result of splitting the original galley of FIG. 5 into smaller fragments;

DETAILED DESCRIPTION INCLUDING BEST MODE

In the preferred embodiment of the present invention, the actual splitting of the galley tree, as discussed above, does not take place. This allows the structure of the galley to remain intact. The advantage of preserving the original structure of the galley tree is that it allows interactive formatting. For instance, it makes it easier to re-send the galley into its targets after the galley or its target has been modified. The re-sending of the galley usually involves moving the splitting boundary between the tree fragments.

The preferred embodiment represents a galley using a Split Tree data structure. The Split Tree data structure allows a split tree to represent both the galley tree and the fragments of the galley tree that are the result of splitting the galley. The advantage is that instead of actually splitting the galley tree, marks are added to the tree. The marks allow an algorithm operating on the split tree to interpret the split tree in the same way as tree fragments would be interpreted.

Figure 1:
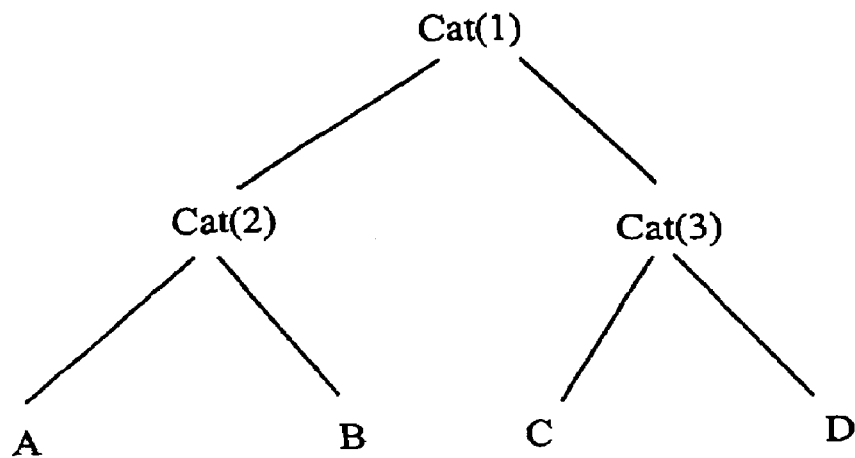
FIG. 1 is an example of an input tree.
Figure 2:
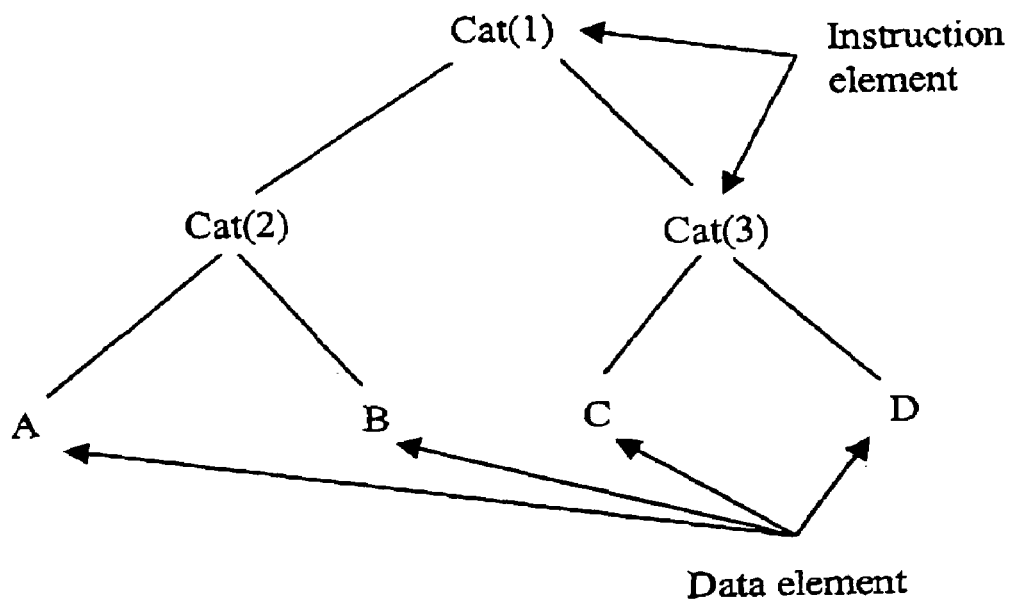
FIG. 2 illustrates types of elements in the input tree.
Figure 3:
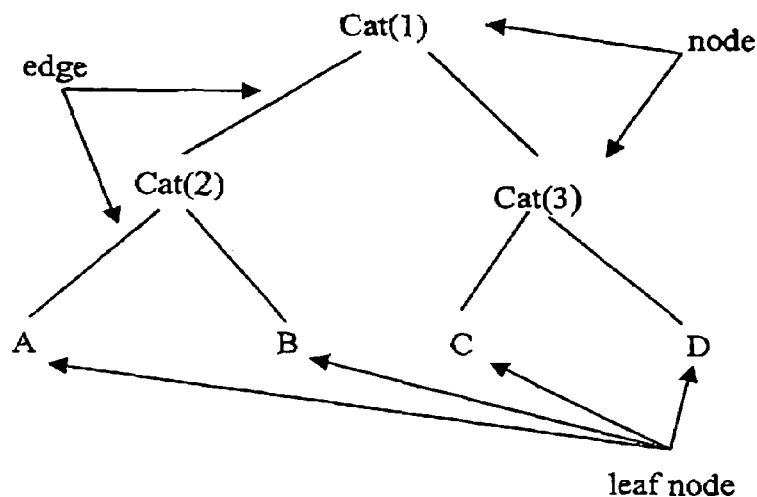
FIG. 3 illustrates nodes, leaf nodes and edges in the input tree.
Figure 4:
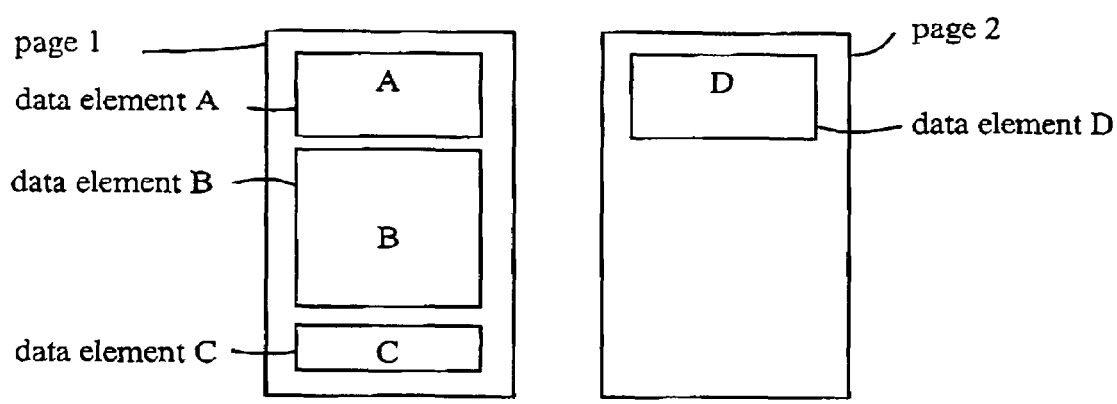
FIG. 4 shows the result of evaluation of the input tree.
Figure 7:
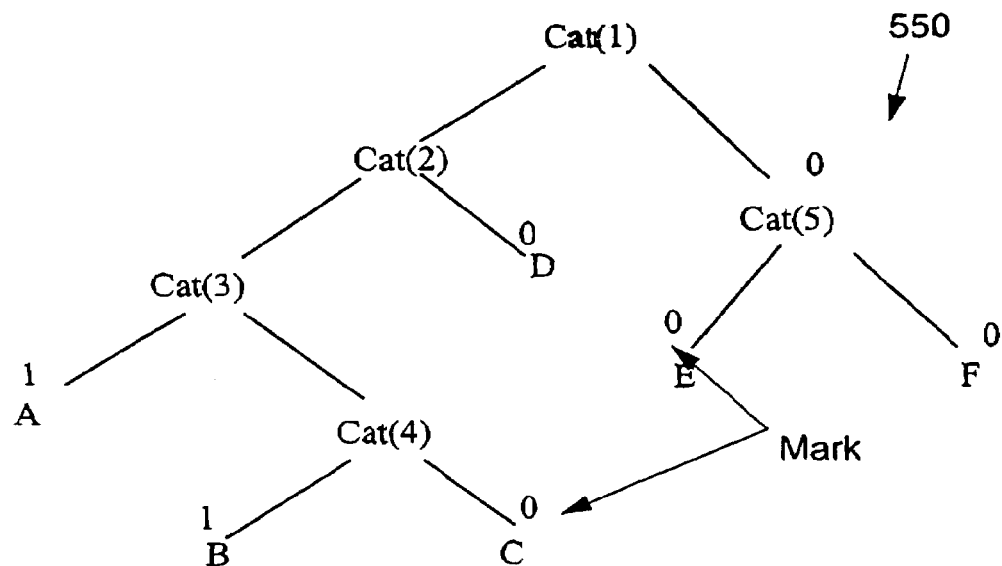
FIG. 7 shows a split tree.

The split tree 550 corresponding to the two galley fragments 510 and 520 in the above example of FIGS. 6A and 6B is presented in FIG. 7. The fragment of the galley tree that is placed into the first galley target is marked with markers '1'. The fragment that did not fit into the first galley target is marked with marker '0'. The marker '0' is a special marker that marks nodes that are still waiting to be placed into galley targets.

The split tree data structure allows each tree fragment in the split tree 550 to be marked with a unique mark. In the preferred embodiment, integers are used as marks.

Figure 8:
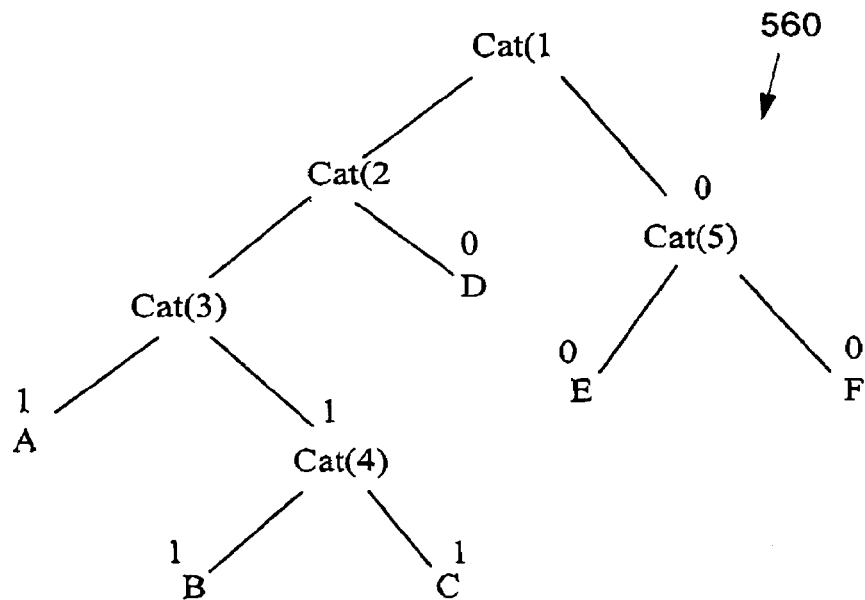
FIG. 8 shows the split tree of FIG. 7 after changes.

FIG. 8 shows another example of a split tree 560. The galley of FIG. 7 is placed into a sequence of galley targets. For this example however, the three data elements A, B as well as C can fit into the first galley target. This change can be a result of a change in the available space for the first galley target, data elements A, B and/or C.

Each node in the split tree can have two, one or no children. The nodes that have no children are also called leaf nodes. The criteria for interpreting the split tree are as follows:

If a node is marked with a marker 'n', the whole subtree attached to that node belongs to the 'n' fragment.

If both the left and right subtrees of a node contain nodes marked with 'n', the node belongs to the 'n' fragment. This criterion has further implications. If a node does not contain nodes marked with the same marker in its left and right subtrees, then such a node does not belong to any fragment and is referred to as an alienated node. Any marked node, therefore a node that is not an alienated node, belongs to one tree fragment only.

If a node has only one child and the child subtree has a node marked with 'n', then the node belongs to the 'n' fragment.

Figure 9:
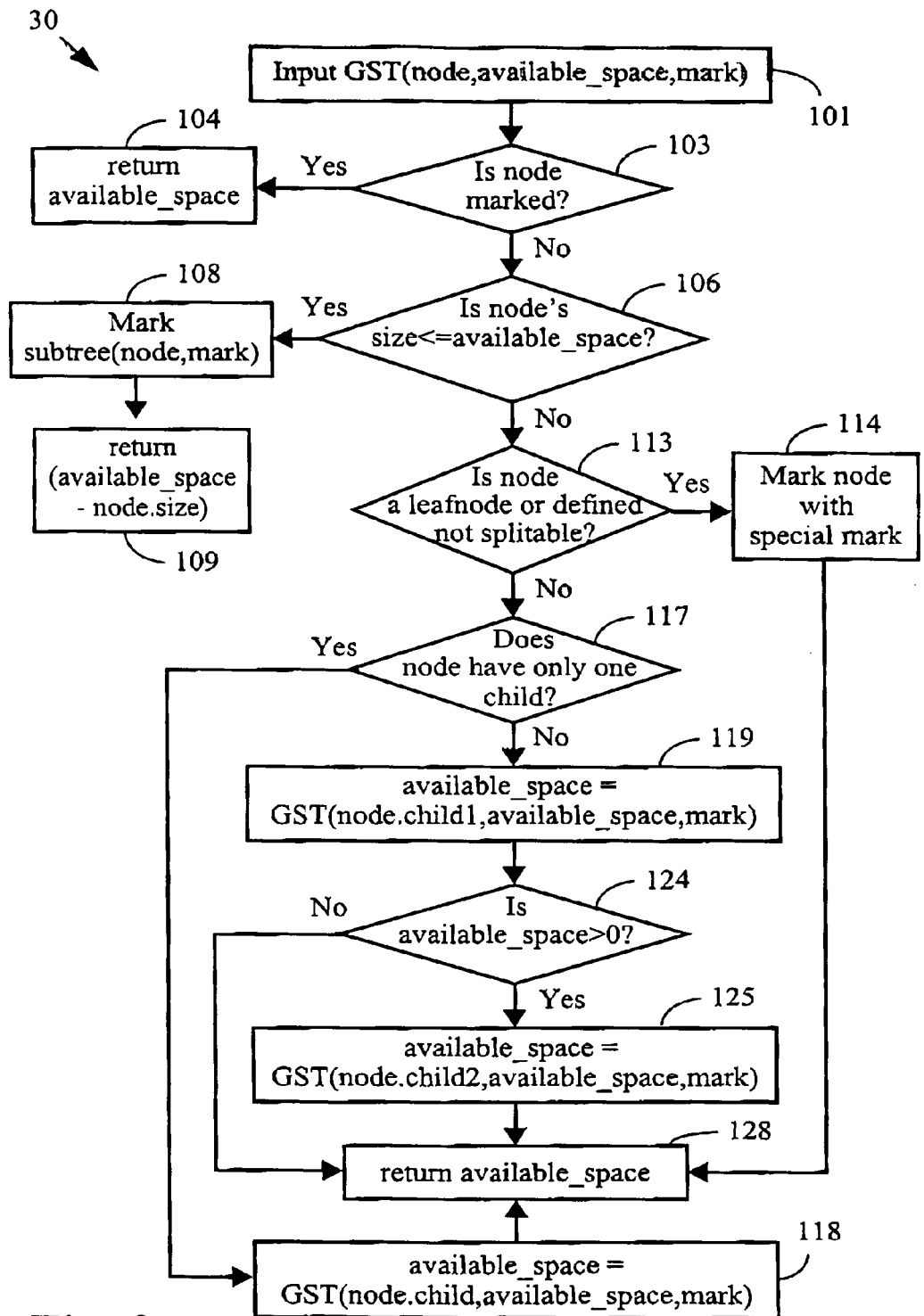
FIG. 9 is a flow diagram of a method of generating a split tree.

A method 300 of adding marks to a split tree is presented in FIG. 9. The purpose of the method 300 is to place the galley tree into its galley targets. In particular, it adds marks to the galley tree, the marks defining which parts of the galley tree are placed into which galley target and returns the space remaining in that galley target.

In step 301 the method 300, named GST, accepts three input parameters, namely:

node—The subtree defined by 'node' that is currently being pushed into a galley target;

available_space—The space available in the galley target for 'node'; and mark—The mark used to mark all nodes that are pushed into a galley target.

Step 303 determines whether 'node' is already marked. If 'node' is marked, it means that it has already been placed into some other target and the subtree defined by 'node' is therefore ignored. The method 300 is then terminated in step 304 after returning 'available_space'. In this case 'available_space' has not change.

For unmarked nodes, the method 300 proceeds to step 306. Step 306 determines whether the subtree defined by 'node' can fit into 'available_space'. If that subtree can fit into 'available_space', then 'node', together with all the other nodes in that subtree, are marked with 'mark' in step 308. As 'node' uses up some of 'available_space', 'available_space' is decreased in step 309 by the size of the subtree defined by 'node'. The value of 'available_space' is returned.

However, if in step 306, the subtree defined by 'node' cannot fit into 'available_space', then the method 300 continues by trying to split the subtree into smaller subtrees. In order to do so, in step 313 which follows, the method 300 verifies whether 'node' is a leaf element (thus have no children nodes) or has been defined as not splitable. In such cases, 'node' cannot be placed into the target, nor can it be split thereby enabling the smaller subtree of 'node' to fit into the target. In step 314, the data elements represented by 'node' is discarded and 'node' is marked with a special discarded mark and the method 300 is terminated in step 328 where the value of 'available_space' is returned.

If 'node' is determined to be splitable in step 313, step 317 determines whether 'node' has only one child. If 'node' has only one child, then step 318 recursively calls the method 300 with the child node as 'node'.

Since leave nodes were filtered out by step 313 and nodes with only one child by step 317, only when 'node' has two children is step 319 performed, where the method 300 is recursively called with a first child of 'node' as 'node'. Then, if step 324 determines that there is space left in the target, the method 300 is called again in step 325 with a second child of 'node' as 'node'. The method 300 terminates by returning the available space in the galley target in step 328.

The method 300 is repeated with the next galley target, until all the data elements are placed. The result is that galleys in the input tree are now converted into split trees by marking the nodes.

Figure 10:
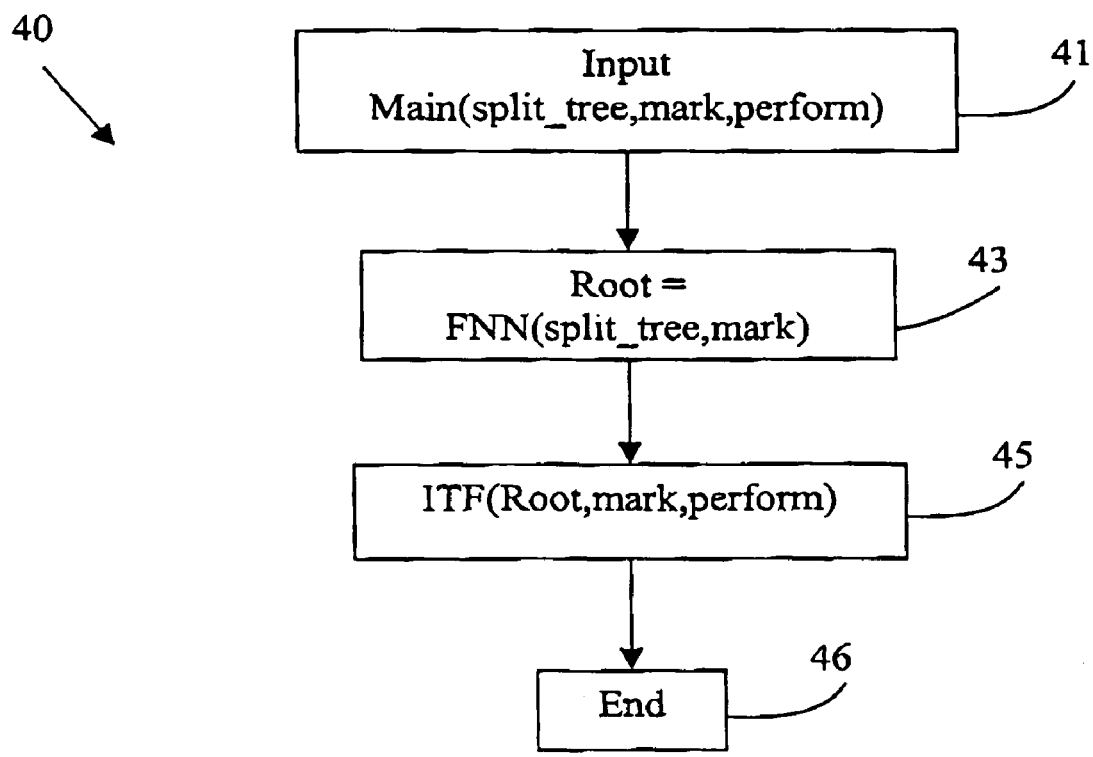
FIG. 10 is a flow diagram of a method of creating tree fragments from a split tree.
Figure 11:
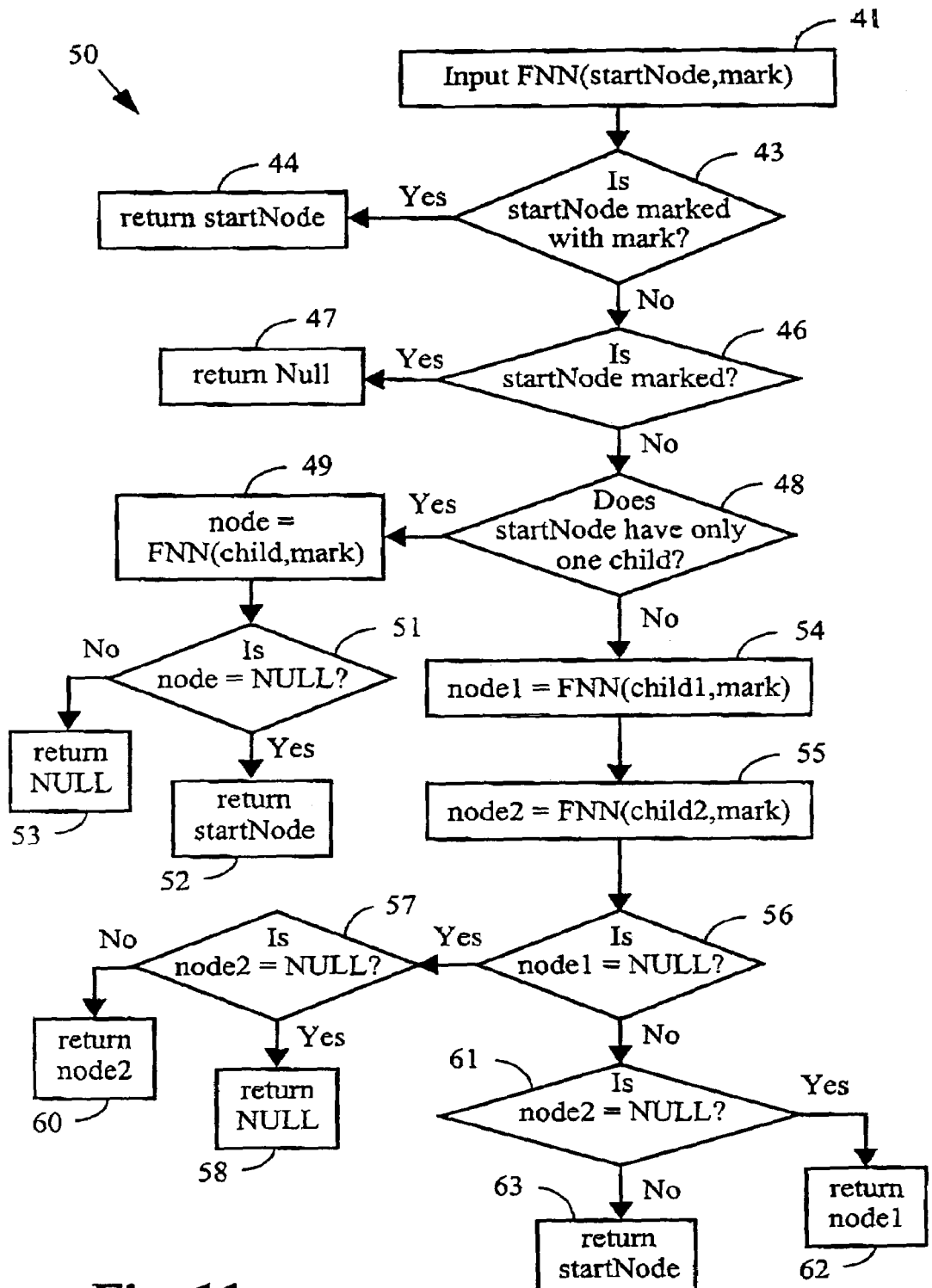
FIG. 11 is a flow diagram of a method of finding a next node.

FIG. 10 presents a method 40 for generating tree fragments from a split tree. The method 40 calls procedures 50 and 70, presented in FIGS. 11 and 12 respectively. These procedures 50 and 70 are discussed first.

Procedure 50 is a recursive procedure that finds a next node belonging to a tree fragment in a split tree. This tree fragment is one of the tree fragments previously defined by marking the input tree, thereby creating the split tree. The tree fragment is accordingly specified by one of the marks used in the split tree. The procedure 50 terminates once a appropriately marked node is found.

Procedure 50 commences with step 41, which accepts two input parameters, namely:

startNode—The node defining the subtree wherein the marked node is searched for; and mark—The mark that marks the node being searched for.

Procedure 50 proceeds to step 43 where it is determined whether 'startNode' is marked with 'mark'. If so, this is the node that is searched for, and the procedure 50 terminates in step 44 by returning 'startNode' to its calling method or procedure.

If the 'startNode' is not marked with 'mark', step 46 follows which determines whether startNode is marked with another mark, such indicates that 'startNode' and all the other nodes in its subtree are marked with a mark other than 'mark'. It is therefore not possible for any node marked with 'mark' to be found in the subtree under review, and the procedure 50 terminates in step 47 by returning NULL to its calling method or procedure.

Therefore, only an unmarked node proceeds to step 48 from where, if step 48 determines that 'startNode' has only one child, then the procedure 50 is called in step 49 with the child node as 'startNode'.

Step 51 determines whether step 49 (calling procedure 50 with the child node) returned with NULL. If NULL was returned, neither 'startNode' nor any of the nodes in the subtree belong to the tree fragment marked with 'mark' and procedure 50 terminates after returning NULL in step 53. However, if step 49 did not return a NULL, the 'startNode' belongs to the tree fragment marked with 'mark'. The procedure 50 returns 'startNode' and terminates in step 52.

Referring again to step 48, only unmarked nodes with two children proceed to step 54 from where procedure 50 is called with the first child as 'startNode'. It is followed by step 55 from where procedure 50 is called with the second child as 'startNode'.

Step 56 determines whether calling procedure 50 with the first child as "startNode" returned NULL. If so, step 56 determines whether calling procedure 50 with the second child as 'startNode' returned a NULL. If NULLs were returned for both the first child and the second child, the calling procedure 50 terminates after also returning NULL in step 58. Thus 'mark' has not been found in any one of the children. If 'mark' has been found in one of the children, procedure 50 will terminate after returning that child node to the calling method or procedure in step 60 or step 62. The remaining alternative is that both children were marked with 'mark' in which case the criteria in both step 56 and step 61 are not met. The procedure 50 terminates by returning 'startNode', being the parent of the two children, at step 63.

Figure 12:
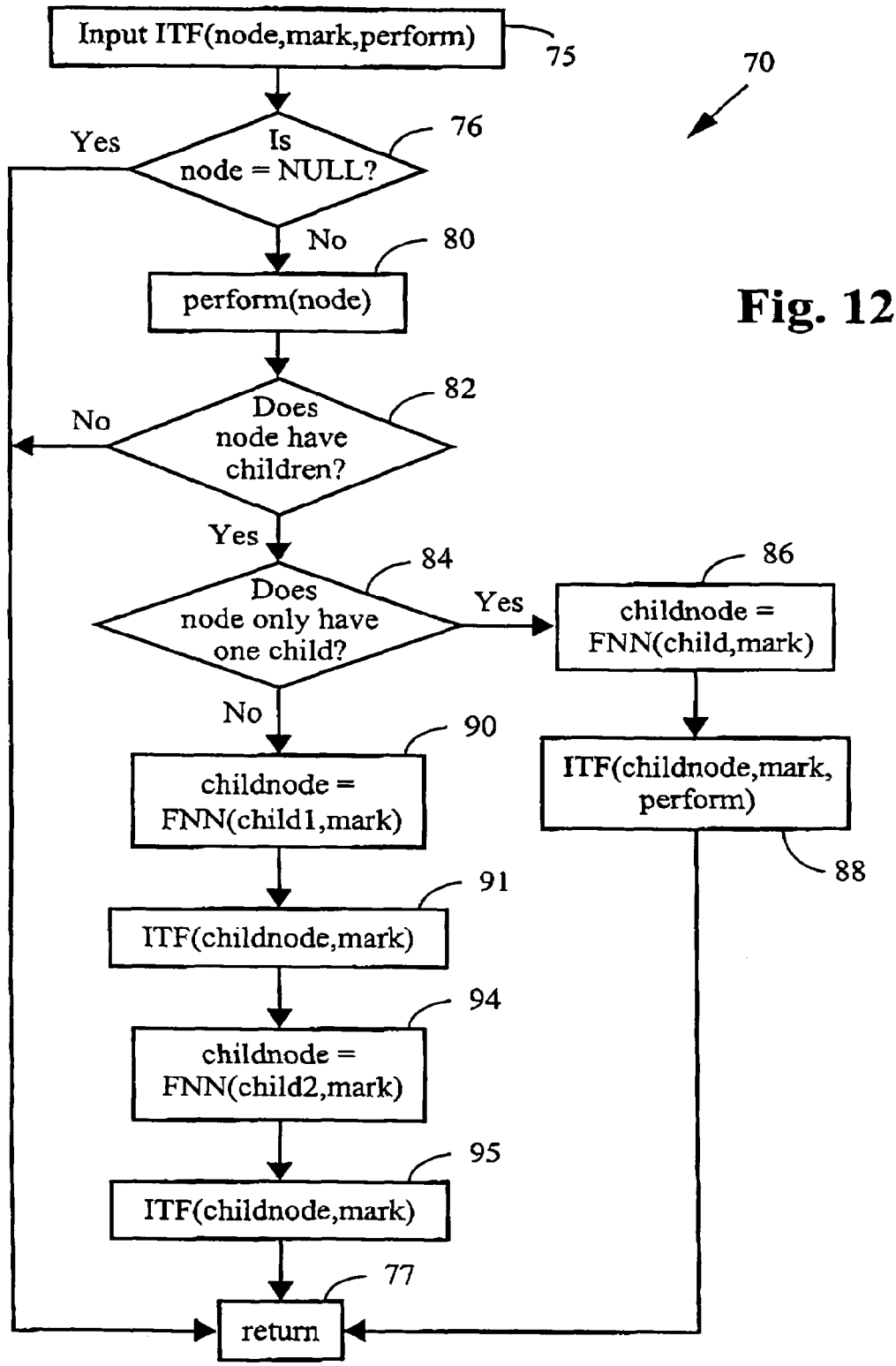
FIG. 12 is a flow diagram of a method of building a tree fragment.

Referring to FIG. 12, procedure 70 for generating nodes of a tree fragment is shown. Procedure 70 is invoked recursively to find all the nodes of a tree fragment in a split tree and to generate a whole tree fragment. The tree fragment is defined by a specific mark.

In step 75, procedure 70 accepts three parameters, namely:

node—A node of a tree fragment;

mark—The mark that marks the nodes belonging to a tree fragment in a split tree; and perform—A function that is invoked for each node belonging to the tree fragment defined by 'mark'.

If step 76 determines that 'node' is equal to NULL, there are no nodes in that subtree marked with 'mark' and step 77 returns procedure 70 to its calling method or procedure.

However, if 'node' is not determined to be equal to NULL in step 76, then step 80 invokes the 'perform' function. This caller-defined function performs required operations on the nodes of the 'mark' tree fragment. This may include saving the result to a file, modifying the attributes of the nodes or displaying the result in a tree form on a user interface.

If step 82 determines that 'node' has no children ie. a leave node, the procedure 70 terminates in step 77 and returns to its calling procedure or method. If step 84 determines that 'node' has only one child, the child subtree is searched in step 86 to find the next node belonging to the tree fragment presently being generated. This is done by calling procedure 50 with the node of the child as 'startNode'. After finding the next node marked with 'mark', procedure 70 is called again in step 88 with this found next node as 'node'. Procedure 70 calling itself recursively will continue adding new child nodes to the generated tree until there are no more nodes in the subtree defined by the child node marked with mark.

If 'node' has two children the procedure 70 will proceed from step 84 to step 90 where, the children subtrees are treated in the same way as a single child, in that steps 90 and 91 will find all the nodes in the subtree defined by the first child and generate a tree until there are no more nodes in the subtree defined by the first child node marked with mark. Steps 94 and 95 repeat identical steps for the second child. The procedure 70 terminates in step 77.

In the preferred embodiment of the invention, method 40, illustrated in FIG. 10, starts in step 41 by accepting three parameters, namely:

split_tree—the root node of the split tree;
mark—the mark that marks the nodes belonging to a tree fragment in a split tree; and
perform—The function that is invoked for each node belonging to the 'mark' tree fragment.

Method 40 proceeds to step 43 where a root node of a tree fragment in a split tree is found. This is performed by calling procedure 50, which will return the first node found with 'mark' as its marking. Procedure 50 returns NULL if the split tree does not contain a tree fragment marked with 'mark'.

Having established the root node in step 43, step 45 calls procedure 70 passing the root node as 'node'. As discussed above, procedure 70 is a recursive procedure for iterating over all the nodes of the tree fragment in the split tree, finding the correctly marked nodes and creating the required tree fragment. Method 40 terminates in step 46.

Figure 13:
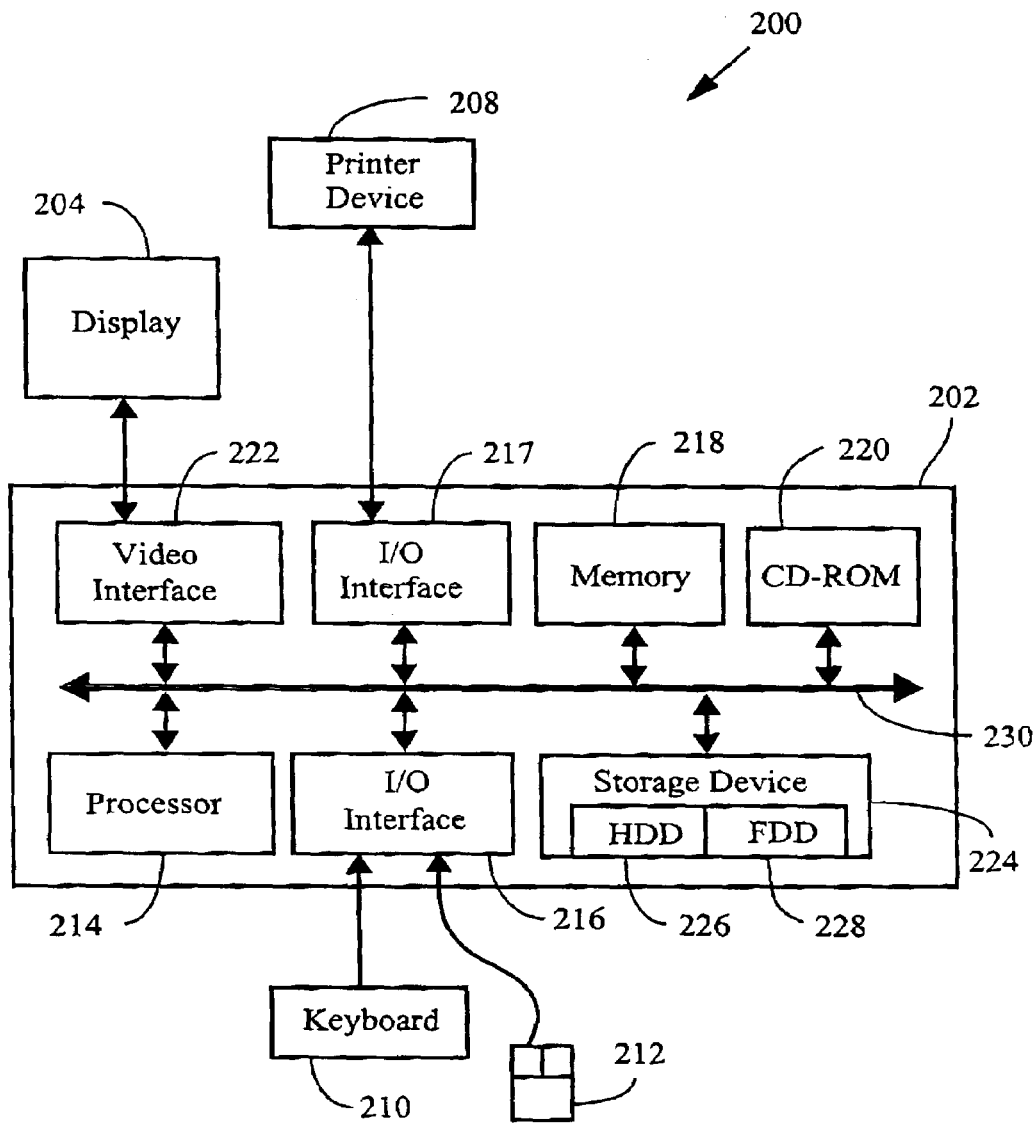
FIG. 13 is a schematic block diagram of a general purpose computer upon which the preferred embodiment of the present invention can be practiced.

The method 30 of marking an input tree to create a split tree and method 40 of creating tree fragments from the split tree, are preferably practiced using a conventional general-purpose computer system 200, such as that shown in FIG. 13 wherein the processes of FIGS. 9 to 12 may be implemented as software, such as an application program executing within the computer system 200. In particular, the steps of methods 30 and 40 are effected by instructions in the software that are carried out by the computer. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for 30 for marking an input tree to create a split tree and for creating tree fragments from the split tree in accordance with the embodiments of the invention.

The computer system 200 comprises a computer module 202, input devices such as a keyboard 210 and mouse 212, output devices including a printer 208 and a display device 104.

The computer module 202 typically includes at least one processor unit 214, a memory unit 218, for example formed from semiconductor random access memory (RAM) and read only memory (ROM), input/output (I/O) interfaces including a video interface 217, and an I/O interface 216 for the keyboard 210 and mouse 212. A storage device 224 is provided and typically includes a hard disk drive 226 and a floppy disk drive 228. A magnetic tape drive (not illustrated) may also be used. A CD-ROM drive 220 is typically provided as a non-volatile source of data. The components 214 to 228 of the computer module 202, typically communicate via an interconnected bus 230 and in a manner which results in a conventional mode of operation of the computer system 200 known to those in the relevant art. Examples of computers on which the embodiments can be practiced include IBM-PC's and compatibles, Sun Sparcstations or alike computer systems evolved therefrom.

Typically, the application program of the preferred embodiment is resident on the hard disk drive 226 and read and controlled in its execution by the processor 214. Intermediate storage of the program may be accomplished using the semiconductor memory 218, possibly in concert with the hard disk drive 226. In some instances, the application program may be supplied to the user encoded on a CD-ROM or floppy disk and read via the corresponding drive 220 or 228. Still further, the software can also be loaded into the computer system 200 from other computer readable medium including magnetic tape, a ROM or integrated circuit, a magneto-optical disk, a radio or infra-red transmission channel between the computer module 202 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The methods of marking an input tree to create a split tree and of creating tree fragments from the split tree may alternatively be implemented in dedicated hardware such as one or more integrated circuits performing the functions or sub functions of processes 30 and/or 40.

The foregoing preferred methods describe only one embodiment of the present invention, and modifications, can be made thereto without departing from the scope of the present invention as defined in the appended claims.

I claim:

1. A method of marking an input tree, the input tree describing a document and comprising a plurality of parent nodes and child nodes, wherein each parent node defines operations to be performed on child nodes of that parent node, said method comprising the steps of:
   (a) determining which of the plurality of nodes fit into a target area within the document;
   wherein said determining step comprises the sub-steps of:
   (a1) setting one of the plurality of nodes as a current node for the target area;
   (a2) comparing the size of the current node with available space in the target area;
   (a3) if the size of the current node is not greater than the available space, deciding that the current node fits into the target area;
   (a4) if the size of the current node is greater than the available space, performing the further sub-steps of:
   (a4i) determining whether the current node is a parent node;

(a4ii) setting one of the child nodes as the new current node if the current node is a parent node; and (a4iii) recursively executing steps (a2) to (a4) with respect to the new current node; and (b) marking the nodes that fit into the target area with a common mark specific to the target area, such that a section of the input tree that fits into the target area is defined while preserving the structure of the input tree; and (c) outputting data elements in the target area, the data elements corresponding to the marked nodes.

2. The method according to claim 1, wherein said determining step further comprises the initial steps of:

checking whether the current node has already been marked; and performing steps (a1) to (a4) if the current node has not been marked.

3. The method according to claim 1, further comprising the step of updating the available space by decreasing the size of the available space by the size of the current node if it is determined that the current node fits into the target area.

4. The method according to claim 1, wherein in step (a4ii), a first node and a second node are set as the new current node, sequentially, when the current node, has two child nodes.

5. The method according to claim 1, wherein in step (b), the current node is marked with a special mark if the size of the current node is greater than the available space and the current node has no children nodes.

6. A method of forming a tree fragment from an input tree, the input tree describing a document and comprising a plurality of parent and child nodes, wherein each parent node defines operations to be performed on child nodes of that parent node, said method comprising the steps of:

identifying nodes marked with a common mark, which is associated with the tree fragment such that a section of the input tree is defined while preserving the structure of the input tree;

generating the tree fragment from the nodes marked with the common mark; and outputting data elements in a target area within the document, the data elements corresponding to the tree fragment.

7. The method according to claim 6, wherein said identifying step comprises the sub-steps of:

setting one of the nodes as a start node;

checking whether the start node is marked with the common mark associated with the tree fragment; and completing the identifying step if the start node is marked with the common mark associated with the tree fragment.

8. The method according to claim 6, wherein said creating step comprises the step of performing a predetermined function on the nodes marked with the common mark associated with the tree fragment.

9. The method according to claim 7, further comprising the steps of:

checking whether the start node has already been marked if the start node is not marked with the common mark associated with the tree fragment;

determining whether the start node has at least one child node if the start node has not been marked;

setting one of the child nodes as the start node if the start node has at least one child node; and recursively executing said identifying step.

10. The method according to claim 9, wherein in said step of setting one of the child nodes, a first node and a second node are set sequentially, when the start node has two children nodes.

11. An apparatus for marking an input tree, the input tree describing a document and comprising a plurality of parent nodes and child nodes, wherein each parent node defines operations to be performed on child nodes of that parent node, said apparatus comprising:

determining means for determining which of the plurality of nodes fit into a target area within the document by performing the steps of:

(a1) setting one of the plurality of nodes as a current node for the target area;

(a2) comparing the size of the current node with available space in the target area;

(a3) if the size of the current node is not greater than the available space, deciding that the current node fits into the target area;

(a4) if the size of the current node is greater than the available space, performing the further sub-steps of:

(a4i) determining whether the current node is a parent node;

(a4ii) setting one of the child nodes as the new current node if the current node is a parent node; and (a4iii) recursively executing the steps (a2) to (a4) with respect to the new current node; and marking means for marking the nodes that fit into the target area with a common mark specific to the target area, such that a section of the input tree that fits into the target area is defined while preserving the structure of the input tree, wherein the apparatus further comprises at least one of a display for displaying data elements in the target area and a printer for printing the data elements in the target area, the data elements corresponding to the marked nodes.

12. The apparatus according to claim 11, wherein said determining means further comprises:

checking means for checking whether the current node has already been marked; and initiating means for initiating said determining means if the current node has not been marked.

13. The apparatus according to claim 11, further comprising updating means for updating the available space by decreasing the size of the available space by the size of the current node if it is determined that the current node fits into the galley target area.

14. The apparatus according to claim 11, wherein in step (a4ii) a first node and a second node are set as the new current node sequentially, when the current node has two children nodes.

15. The apparatus according to claim 11, wherein said marking means marks the current node with a special mark if the size of the current node is greater than the available space and the current node has no child nodes.

16. An apparatus for forming a tree fragment from an input tree, the input tree describing a document and comprising a plurality of parent and child nodes, wherein each parent node defines operations to be performed on child nodes of that parent node, said apparatus comprising:

identification means for identifying nodes marked with a common mark, which is associated with the tree fragment such that a section of the input tree is defined while preserving the structure of the input tree;

creating means for generating the tree fragment from the nodes marked with the common mark; and at least one of a display for displaying data elements in a target area within the document or a printer for printing the data elements in the target area, the data elements corresponding to the tree fragment.

17. The apparatus according to claim 16, wherein said identifying means comprises:
   setting means for setting one of the nodes as a start node;
   checking means for checking whether the start node is marked with the common mark associated with the tree fragment; and
   completing means for completing the identification if the start node is marked with the common mark associated with the tree fragment.

18. The apparatus according to claim 17, further comprising:
   mark checking means for checking whether the start node has already been marked if the start node is not marked with the common mark associated with the tree fragment;
   child node determining means for determining whether the start node has at least one child node if the start node has not been marked;
   second setting means for setting one of the child nodes as the start node if the start node has at least one child node; and
   controlling means for recursively initiating said identification.

19. The apparatus according to claim 18, wherein said second setting means sets a first node and a second node sequentially, when the start node has two children nodes.

20. The apparatus according to claim 16, wherein said creating means comprises function means for performing a predetermined function on the nodes marked with the common mark associated with the tree fragment.

21. A computer program product including a computer-readable storage medium incorporating a computer program for marking an input tree, the input tree describing a document and comprising a plurality of parent nodes and child nodes, wherein each parent node defines operations to be performed on child nodes of that parent node, said computer program product comprising:
   means for determining which of the plurality of nodes fit into a target area within the document by performing the steps of:
      (a1) setting one of the plurality of nodes as a current node for the target area;
      (a2) comparing the size of the current node with available space in the target area;
      (a3) if the size of the current node is not greater than the available space, deciding that the current node fits into the target area;
      (a4) if the size of the current node is greater than the available space, performing the further sub-steps of:
         (a4i) determining whether the current node is a parent node;
         (a4ii) setting one of the child nodes as the new current node if the current node is a parent node; and
         (a4iii) recursively executing steps (a2) to (a4) with respect to the new current node;
   means for marking the nodes that fit into the target area with a common mark specific to the target area, such that a section of the input tree that fits into the target area is defined while preserving the structure of the input tree; and
   means for outputting data elements in the target area, the data elements corresponding to the marked nodes.

22. A computer program product including a computer-readable storage medium incorporating a computer program for forming a tree fragment from an input tree, the input tree describing a document and comprising a plurality of parent and child nodes, wherein each parent node defines operations to be performed on child nodes of that parent node, said computer program product comprising:
   means for identifying nodes marked with a common mark, which is associated with the tree fragment such that a section of the input tree is defined while preserving the structure of the input tree;
   means for generating the tree fragment from the nodes marked with the common mark; and
   means for outputting data elements in a target area within the document, the data elements corresponding to the tree fragment.

* * * * *

UNITED STATES PATENT AND TRADEMARK OFFICE
CERTIFICATE OF CORRECTION

PATENT NO. : 7,243,302 B1 Page 1 of 1
APPLICATION NO. : 09/599950
DATED : July 10, 2007
INVENTOR(S) : Pawel Rej It is certified that error appears in the above-identified patent and that said Letters Patent is hereby corrected as shown below:

DRAWINGS:
Sheet 5, FIG. 9, Reference Numeral 113, "splitable" should read -- splittable --.

COLUMN 1:
Line 54, "13," should read -- B, --;
Line 58, "are placed" should read -- is placed --; and
Line 61, "data" should read -- of data --.

COLUMN 3:
Line 14, "rich" should read -- which --.

COLUMN 5:
Line 32, "splitable." should read -- splittable. --;
Line 36, "is" should read -- are --; and
Line 43, "leave" should read -- leaf --.

COLUMN 7:
Line 4, "leave" should read -- leaf --.

Signed and Sealed this

Fourth Day of November, 2008

JON W. DUDAS
*Director of the United States Patent and Trademark Office*